Dec. 12, 1933.    A. C. VAN HOUWELING    1,939,474
LIME SPREADING ATTACHMENT FOR MANURE SPREADERS
Filed May 13, 1930
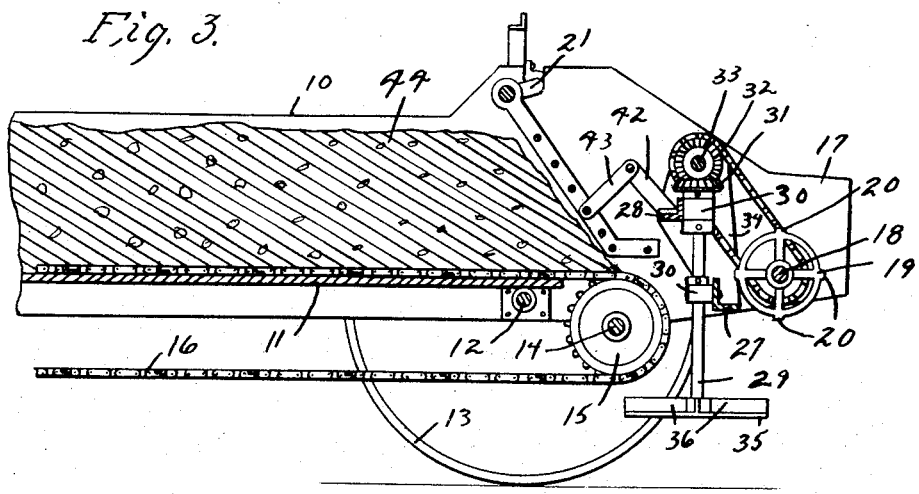
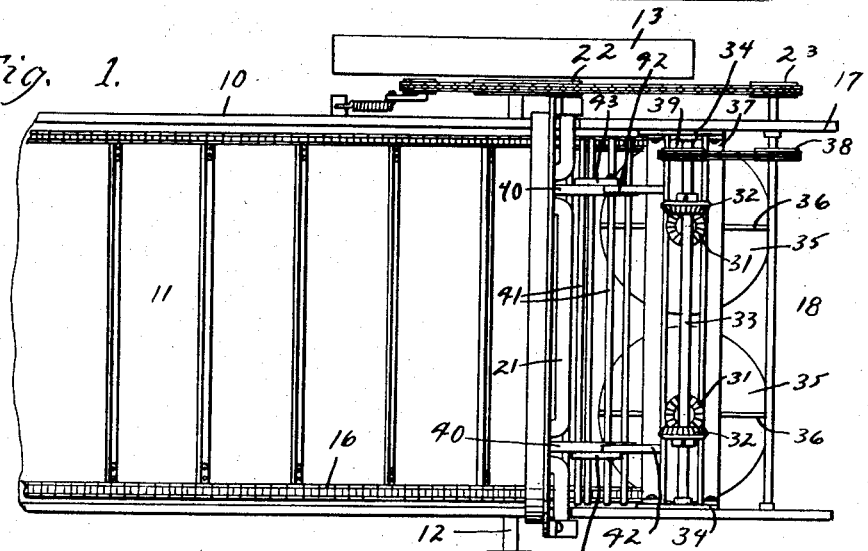
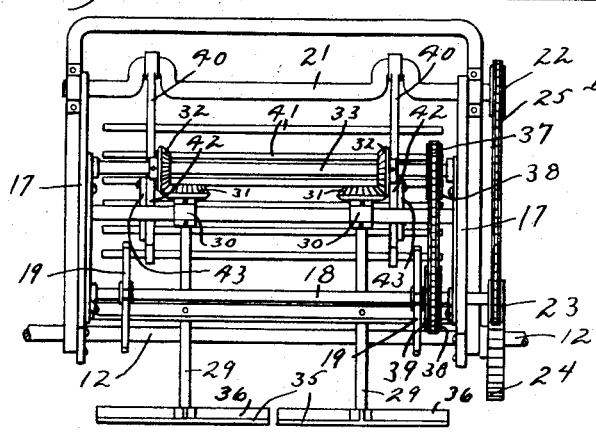
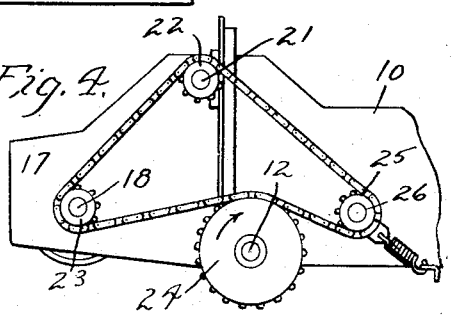
Inventor
Arthur C. Van Houweling
by Orwig & Hague Attys Patented Dec. 12, 1933

1,939,474

UNITED STATES PATENT OFFICE 1,939,474

LIME SPREADING ATTACHMENT FOR MANURE SPREADERS

Arthur C. Van Houweling, Pella, Iowa

Application May 13, 1930. Serial No. 451,925

8 Claims. (Cl. 275—6)

The object of my invention is to provide a lime spreading attachment for manure spreaders of simple, durable and inexpensive construction, which may be easily and quickly attached, and when so attached the mechanism ordinarily used to drive the beaters of the spreader may be utilized for operating my improved attachment.

More specifically it is the object of my invention to provide mechanism to be used in the delivery end of the spreader box for loosening masses of lime and dividing the same into small particles as the lime is fed rearwardly by means of the feeding apron to feed the particles of lime more uniformly to the spreader devices, and at the same time prevent large masses of lime from spreading downwardly and rearwardly.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a plan view of the rear end of a spreader box showing the manner in which my improved device is applied thereto.

Figure 2 is a rear end view of same.

Figure 3 is a longitudinal, vertical, sectional view.

Figure 4 is a side elevation of the driving gears.

Referring to the accompanying drawing I have used the reference numeral 10 to indicate the spreader box provided with a bottom 11. An axle 12 is provided for supporting the rear end of the box, and is carried by suitable wheels 13. Mechanism is provided for imparting rotary movement to the axle 12 through the wheels 13 as the spreader is advanced over the ground surface.

Rotatively mounted in the rear end of the box 11 is a shaft 14 carrying sprocket wheels 15 designed to drive the feeding apron 16, the upper run of which travels on the upper surface of the bottom 11. The ordinary feeding mechanism operated from the shaft 14 is provided for imparting rotary motion to the shaft 14. This mechanism is not shown, inasmuch as it forms no part of my present invention.

The shaft 14 is usually rotated intermittently. Supported in the rearwardly extending portion 17 of the box 10 is a shaft 18 designed to support the rear beater, comprising hub members 19 having radially projecting lugs 20 to which the beater bars, not illustrated, are attached. The said beater bars are removed at the time my improved attachment is connected. The upper and forward beater is removed and a crank shaft 21 is substituted for the beater shaft. One end of the shaft 21 is provided with a sprocket 22, while the corresponding end of the shaft 18 is provided with a sprocket wheel 23. The axle 12 is also provided with a sprocket 24. A chain 25 is mounted on said sprockets in the manner clearly illustrated in Figure 4. A spring actuated idler sprocket 26 is provided for securing the chain in position under tension.

By this arrangement it will be seen that if the spreader is advanced, the sprocket 24 will be rotated in a clockwise direction, as illustrated in Figure 4, and rotary motion imparted to the shafts 18 and 21 through the chain 25.

Supported between the side members of the rearwardly extending portion 17 is a pair of angle irons 27 and 28 located a slight distance back of the delivery end of the apron 16. Said angles are designed to support a pair of vertical shafts 29, rotatively mounted in suitable bearings 30.

The upper end of each of the shafts 29 is provided with a bevel gear 31. Said gears 31 are in mesh with bevel gears 32 mounted on a shaft 33. Said shaft, together with the angle irons 27, is mounted in suitable plates 34 detachably supported inside of the side members 17.

The lower ends of the shafts 29 are provided with spreader disks 35, the upper surface of each having radially supported blades 36. Supported on one end of the shaft 33 is a sprocket 37, while the corresponding end of the shaft 18 is provided with a sprocket 38. A chain 39 is provided for connecting said sprockets. Rotation of the crank shaft 18 provides means for rotating the shaft 33, which in turn provides means for rotating the spreader disks 35 in an opposite direction. Said disks 35 are mounted in such manner that material delivered over the rear end of the bottom 11 by means of the apron 16 will fall on said disks, which will then be thrown horizontally in all directions by centrifugal force.

Supported on each of the cranks of the shaft 21 is a bar 40. Said bars 40 are designed to support a series of spaced and transversely arranged rods 41. The rear and lower ends of said bars 40 are bent to form a substantially horizontal portion, as illustrated in Figure 3. It will be seen that the rack formed by the bars 40 and the rods 41 is supported in a downwardly and rearwardly inclined plane. The upper and forward ends of the rack are mounted above the top edge of the wagon box and the rear end terminates a slight distance above the delivery end of the apron 16.

The angle 28 is provided with brackets 42, each of which is provided with a link 43 for pivotally connecting the lower ends of the bars 40. By this arrangement it will be seen that as the shaft 21 is rotated in an anti-clockwise direction, as illustrated in Figure 3, the upper end of the rack will travel through a rotary path, while the lower end of the rack bar will reciprocate substantially in a curved path formed by the links 43.

The practical operation of my device is as follows:

Assuming that the spreader has been loaded with small particles of lime stone indicated by the numeral 44, and that the apron 16 is being advanced to draw the mass of lime rearwardly, which is done gradually, and that the shafts 21 and 33 are being rotated by the mechanism above described, then it will be seen that the bars 41 will be brought into engagement with the rear end of the mass of lime 44, and particles of the mass worked loose and moved downwardly on one-half of the revolution of the shaft 21, which is then delivered over the rear end of the bottom 11 to the upper surfaces of the disks 35. The said disks then throw the particles of lime horizontally in all directions.

The bars 41 perform the double function of providing means for working the particles of the mass loose and delivering them downwardly, and at the same time provide means for preventing large portions of the mass 44 from sliding downwardly and rearwardly and being delivered to the disks 35.

By this construction means is provided whereby the lime will be fed very uniformly to the upper surfaces of the disks 35.

Thus it will be seen that I have provided a feeding attachment for lime spreaders, which provides means whereby the lime will be more uniformly distributed to the spreading disks, and which may be easily and quickly attached to or removed from the ordinary spreader.

I claim as my invention:

1. A spreader comprising a box, a feeding apron in the bottom of said box, spreader disks mounted to rotate about a vertical axis for receiving material from said apron, means for operating said spreader disks in opposite directions, a downwardly and rearwardly inclined feeding rack mounted in the rear end of said box having its lower end terminating near the lower end of said apron, and means for imparting rotary reciprocating movement to said rack, for the purposes stated.

2. In combination, a spreader mechanism having a box, a feeding apron therein, and scattering devices at the delivery end of said apron, a downwardly and rearwardly inclined feeding rack comprising a series of spaced and transversely arranged bars, and means for reciprocating said rack to loosen and deliver material downwardly and rearwardly in small quantities to said scattering devices.

3. A spreader mechanism having a box, a feeding apron therein for delivering material to the rear end of said box, a rack comprising side members and a series of transversely arranged spaced rods, said rack being supported substantially in a downwardly and rearwardly inclined position in the rear end of said box, having its lower end terminating a slight distance above the delivery end of said apron, and its upper end terminating near the upper edge of said box, means for imparting rotary movement to the upper end of said rack, and means for supporting the lower end of said rack to reciprocate in a downwardly and rearwardly inclined plane.

4. A spreader mechanism having a box, a feeding apron therein for delivering material to the rear end of said box, a rack comprising side members and a series of transversely arranged spaced rods, said rack being supported substantially in a downwardly and rearwardly inclined position in the rear end of said box, having its lower end terminating a slight distance above the delivery end of said apron, and its upper end terminating near the uper edge of said box, means for imparting rotary movement to the upper end of said rack, means for supporting the lower end of said rack to reciprocate in a downwardly and rearwardly inclined plane, a spreader device supported below the delivery end of said apron and said rack, and means for operating said spreader device.

5. In combination a spreader mechanism having a box, a feeding apron therein, a downwardly and rearwardly inclined feeding rack comprising a series of spaced transversely arranged bars, and means for reciprocating said rack to loosen and deliver material downwardly and rearwardly.

6. The combination of a spreader box having one end open, means for delivering material therein toward its open end, a downwardly and rearwardly inclined feeder rack supported in said body near its open end, comprising a series of spaced and transversely arranged bars, and means for reciprocating said rack to loosen and deliver material downwardly and rearwardly through the open end of said box.

7. In combination a spreader mechanism having a box, a downwardly and rearwardly inclined feeding rack, means for imparting a reciprocating rotary movement to the upper end of said rack, link mechanism pivotally connected to said rack at a point intermediate its upper and lower edges, said rack comprising side members and a series of spaced transversely arranged bars, and means for feeding material rearwardly in said box to said rack.

8. In combination, a spreader mechanism including a box, a downwardly and rearwardly inclined feeding rack supported in one end of said box, means for imparting rotary and reciprocating movement to the upper end of said rack, links pivoted to said box, means for pivoting the free ends of said links to said rack at points intermediate its ends, and means for feeding material from said box to said rack.

ARTHUR C. VAN HOUWELING.